United States Patent [19]

Frosch et al.

[11] 4,415,942

[45] Nov. 15, 1983

[54] MAGNETIC DISK SUBSTRATE OF FIBER-REINFORCED PLASTIC

[75] Inventors: Albert Frosch, Herrenberg; Holger Hinkel, Boeblingen; Georg Kraus, Wildberg, all of Fed. Rep. of Germany

[73] Assignee: International Business Machines Corporation, Armonk, N.Y.

[21] Appl. No.: 287,674

[22] Filed: Jul. 28, 1981

[30] Foreign Application Priority Data

Sep. 6, 1980 [DE] Fed. Rep. of Germany ..... 80105339

[51] Int. Cl.$^3$ ............................................. G11B 5/62
[52] U.S. Cl. .................................... 360/135; 156/239; 156/279; 427/128
[58] Field of Search ........................... 360/135, 97–99; 427/127–132; 156/239, 279

[56] References Cited

U.S. PATENT DOCUMENTS

| 3,646,533 | 2/1972 | Rosenblum | 340/174.1 R |
| 3,761,333 | 9/1973 | Kleinbeck et al. | 156/64 |
| 4,376,963 | 3/1983 | Knoop | 360/135 |

FOREIGN PATENT DOCUMENTS 1264716 2/1972 United Kingdom ................ 360/135

OTHER PUBLICATIONS

S. A. Tobias and R. N. Arnold "The Influence of Dynamical Imperfection on the Vibration of Rotating Disks" Proc. I.M.E. vol. 171, No. 2 (1957), pp. 669–690.
IBM Technical Disclosure Bulletin vol. 18, No. 9, Feb. 1976.

Primary Examiner—Robert L. Richardson
Attorney, Agent, or Firm—Walter J. Madden, Jr.

[57] ABSTRACT

The substrate 1 for magnetic disks takes the form of a laminate made up of a plurality of individual thin, fiber-reinforced, anisotropic and unidirectional lamellae. These lamellae are arranged staggered on top of each other at few angular spacings, i.e., at great angles of up to 60°, and are finally pressed together. The outer layers and lamellae, respectively, may be reinforced by stronger fibers or other material, such as carbon fibers outside and glass fibers inside, to influence the flexural modulus and the shearing modulus independently of each other. This makes for a substrate which consists of anisotropic material, whose characteristics are essentially isotropic, which is lighter than previously used substrates, and which has a higher critical number of revolutions.

10 Claims, 2 Drawing Figures

MAGNETIC DISK SUBSTRATE OF FIBER-REINFORCED PLASTIC

BACKGROUND OF INVENTION

1. Field of Invention

The invention concerns a magnetic disk substrate of plastic containing fibers.

2. Prior Art

U.S. Pat. No. 3,761,333 shows the use of substrates of plastic containing fibers for the production of magnetic disks. Such a substrate, together with magnetic foils, is placed in a mold and pressed to form a magnetic disk. In addition to the fact that this substrate has no substantially isotropic lamellar structure, it is not suitable for rotating at the high speeds required for present and future applications.

Extremely high storage densities necessitate an increasing number of revolutions. In addition, the problem of disk vibrations in the axial direction, i.e., in the direction parallel to the rotation axis of the disk, is becoming increasingly critical. In the case of rotating disks, there are two resonance frequencies, one of which, as a study by S. A. Tobias and R. N. Arnold "The Influence of Dynamical Imperfection on the vibration of Rotating Disks" PROC. I.M.E., Vol. 171, No. 2 (1957), 669–690, has shown, is particularly critical because at a given number of revolutions $\Omega_c$, a slight static load is sufficient for resonance to occur. Such a slight static load may take the form of the magnetic head resting on or floating above the magnetic disk, so that the magnetic disk has to be operated below the critical number of revolutions.

For increasing the natural frequency of magnetic disks and for damping vibrations parallel to the rotation axis, both being necessary to obtain a higher number of revolutions, UK Pat. No. 1,264,716 shows mechanically reinforcing the magnetic disks to different degrees. For this purpose, disks with a diameter decreasing towards the outside are provided on one or both sides of the actual magnetic disk. In their centers, these additional disks are rigidly connected to the magnetic disk, being arranged on its outside. This leads to friction between the magnetic disk and the additional reinforcing disks when the magnetic disk is bent in the direction of the rotation axis. As a result of this friction, which occurs in particular at high speeds, i.e., high frequencies, the high-frequency vibrations are satisfactorily damped. Low-frequency vibrations, however, as occur in the vicinity of the above-mentioned critical number of revolutions, are very poorly damped. It can be assumed that the critical number of revolutions is reduced by subdividing the disks into several individual disks or by adding further disks with diameters decreasing towards the outside. Therefore, this known solution is equally unsuitable for producing magnetic disks or magnetic disk substrates, the number of revolutions of which can be considerably increased above the values presently obtainable.

U.S. Pat. No. 3,646,533 shows a magnetic disk structure, the core of which is structured in the form of a honeycomb and the outside of which is metallically coated. This honeycomb structure, in which the honeycombs extend in the direction of the rotation axis and which are subsequently sealed, for example, by copper plates, serves to damp mechanical vibrations parallel to the rotation axis, in order to obtain higher rotation speeds at a higher natural frequency of the disk core. An essential disadvantage is the thickness required for such a disk. Tests have shown that to obtain the same critical number of revolutions as for the presently employed AlMg5 magnetic disk substrates with a thickness of 3 mm, the "honeycomb" disk described above has to be thicker than 1 cm if copper disks of 0.3 to 0.5 mm thickness are used as outer surfaces. A greater disk thickness means, however, that there are fewer disks in a pack. A further disadvantage of this honeycomb structure is that when the structure is bent, unevenness results because of the sharp edges occurring. This leads to problems if an extremely high degree of evenness is required.

SUMMARY OF THE INVENTION

The present invention solves the problem of providing a magnetic disk substrate of fiber-reinforced plastic which is suitable for a very high number of revolutions higher than the values presently used and obtainable, and which, being made up of anisotropic material, has substantially isotropic properties.

The present invention provides a magnetic disk substrate with isotropic, mechanical properties in the disk plane at only a low remanent anisotropy of the flexural modulus. This disk is lighter than conventional disk substrates (e.g., of AlMg5), and permits a higher number of revolutions without incalculable and detrimental vibrations. An essential advantage is that the substrate in accordance with the invention completely eliminates the problem of electrocorrosion which is quite serious between metallic substrate and metallic magnetic layer. Thus, the magnetic disk substrate in accordance with the invention forms an excellent basis both for particulate magnetic layers and for metallic, magnetic thin-film layers. The fact that only few angles of arrangement and only one type or few types of differently shaped, thin preimpregnated lamellae, so-called prepregs, are required, makes for a simple production process of the substrate in accordance with the invention.

The reinforcement of the outer lamellae provided in accordance with a particularly advantageous further development of the invention, for example, by using carbon fibers if glass fibers are used inside or carbon fibers with a higher Young's modulus than the fibers used inside, offers the advantage that the flexural modulus is increased more than proportional to the shearing modulus in the disk plane, which improves the critical number of revolutions.

DESCRIPTION OF THE PREFERRED EMBODIMENT

Figure 1:
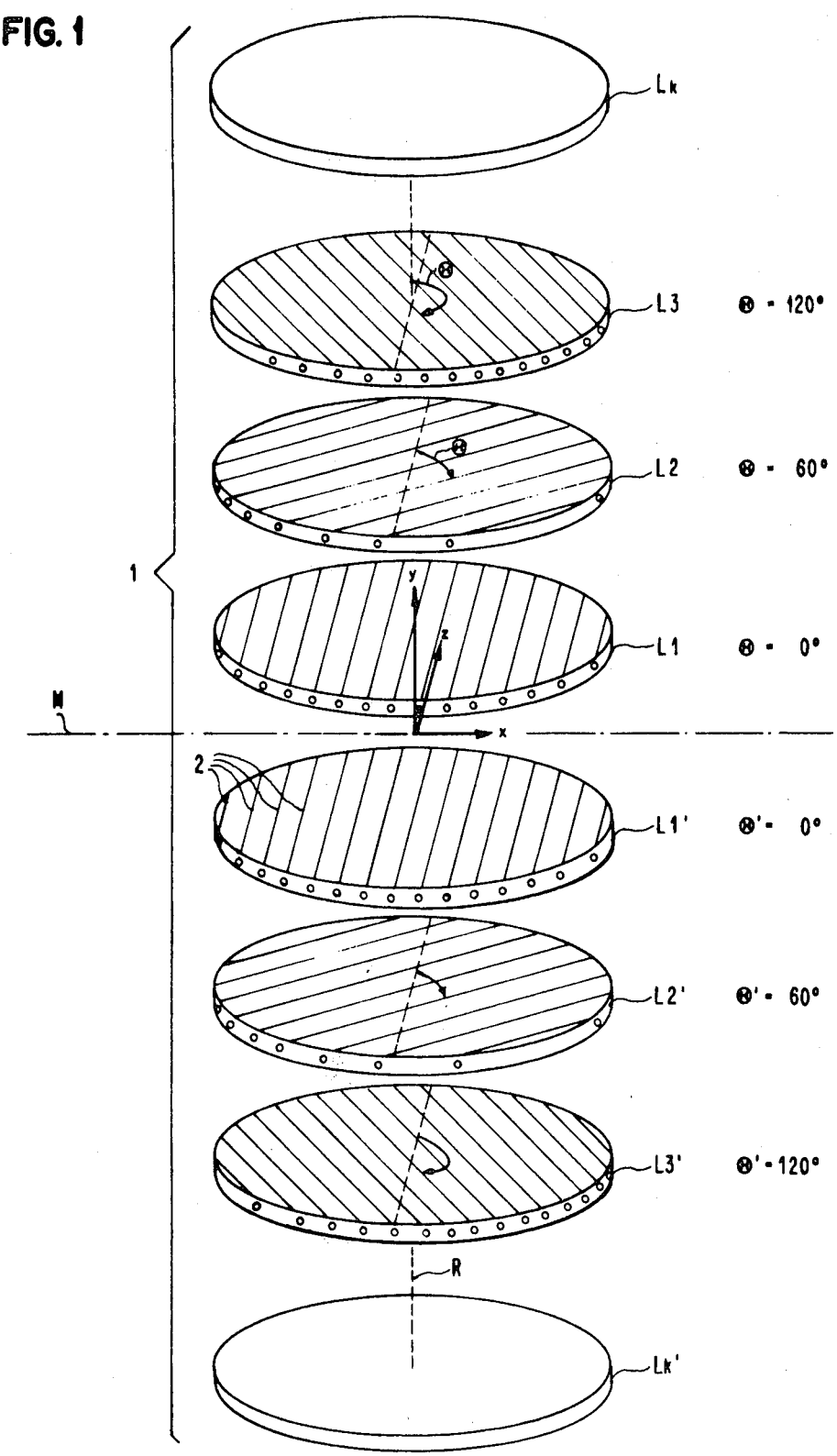
FIG. 1 is a perspective schematic view showing, in an extended form, the individual thin, anisotropic, fiber-reinforced plastic lamelae arranged on top of each other at different angles.

The magnetic disk substrate 1 shown in FIG. 1 comprises a number of individual lamellae L1, L1', L2, L2' to Lk, Lk'. These individual lamellae include fibers 2 which extend in one and the same direction in each lamella L. These individual lamellae are arranged on top of each other at different angles $\theta$ and are pressed together under the influence of heat to form the substrate 1.

The fibers 2 may be glass fibers or carbon fibers. Their thickness may be about 5 to 10 μm in the case of carbon fibers and slightly more in the case of glass fibers. The lamella thickness for commercially available lamellae is about 0.1 to 0.15 mm. As the individual glass or carbon fibers are very thin, much smaller lamellae can be obtained. The filling factor, i.e., the percentage of fibers in the resin material is about 60 percent by volume. The fibers 2 extend from one edge to the other edge of the individual lamella L, i.e., they have the length of a chord of the round lamella.

Looking at the individual preimpregnated, fiber-reinforced lamella, so-called prepreg, this is anisotropic in its plane with regard to its mechanical properties when subjected to tensile, flexural and shearing forces. A magnetic disk substrate, however, must be as isotropic as possible with regard to its mechanical characteristics in the disk plane x-z and with regard to its flexural characteristics in the case of vibrations parallel to the rotation axis R, i.e., in the y-direction (see FIG. 1).

To obtain a better isotropy for the shearing modulus and the Young's modulus in the disk plane x-z, one would usually expect the individual lamellae L to be arranged at a plurality of angles, i.e., at angles which are as small as possible between the directions of the fibers 2. These angles could be, for example 0°, 22.5°, 45°, 67.5°, 90°, 112.5°, 135°, 157.5°. In such a case, however, the isotropy of the flexural modulus declines when the lamella is bent about an axis in the disk plane x-z, i.e., in the case of a vibration in direction y. The isotropy of the flexural modulus and the flexural modulus as such are influenced to a greater extent by the outer lamellae than by the inner lamellae in the vicinity of the neutral center plane M. If the full angle of 360° is realized by many lamellae, using small angular steps, the isotropy of the flexural modulus is reduced.

Despite these diametrically opposed prerequisites, tests have been made which showed that contrary to expectations, the Young's modulus and the shearing modulus in the disk plane x-z are fully isotropic for all angles of arrangements θ which are smaller or equal to 60°. The angle of arrangement is an integral multiple of π, where the smallest integer is 3, i.e., $\theta = \pi/n$ with n an integer, $\geq 3$. At an integrel number of lamellae the full angle of 360° must be obtained. This permits the continued production of laminates, the flexural modulus of which is largely isotropic. At the largest possible angle of arrangement θ of 60°, as shown in the figures, at which the shearing and the Young's moduli are isotropic, the full angle of 360° is obtained by using only three lamellae L1 to L3. This also ensures the smallest anisotropy of the flexural modulus.

To ensure that the characteristics of the magnetic disk substrate 1, as shown in FIG. 1, are as isotropic as possible in every respect, the substrate is preferably structured in such a manner that the number of lamellae L1 to Lk arranged above the center plane M corresponds to that below the center plane M comprising lamellae Lk' to Lk'. To this end, the lamellae corresponding to each other, such as L1, L1' and L2, L2' and Lk, Lk', respectively are arranged at the same angle of arrangement θ. Thus, one lamella on one side of the center plane M corresponds to one lamella on the other side of the center plane M, which bears the same ordinal number and which is arranged at the same angle of arrangement. An arrangement pattern of this kind is shown in greater detail in FIG. 2.

Figure 2:
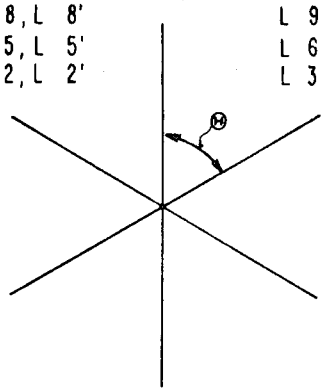
FIG. 2 is a pattern of arrangement for a laminate with 48 lamellae at a 60° angle of arrangement $\theta$.

In addition to the pattern of arrangement shown in FIG. 2, which is based on the structure illustrated in FIG. 1 and according to which two layers arranged at the same angle are shown immediately above and below the center plane M, the pattern of arrangement can be such that one lamella with its center is positioned on the very center plane M. In the latter case, a number of lamellae divisible by three is to be arranged above and below said lamella. Such a pattern meets the requirement that the angle of arrangement be 60°. Good results have been obtained with laminates comprising 15 layers or lamellae.

If pure carbon fiber lamellae are used, the fiber modulus of which is between about 180 and 360 GPa, then the critical number of revolutions is already 25 to 30 percent above that of AlMg5 disk substrates, but the weight is considerably lower. Computations have shown that 24 layers, the outer three layers of which, above and below the center line, consist of carbon fiber reinforced lamellae L and the inner eighteen layers of which consist of glass fiber reinforced lamellae L, yield at least the critical number of revolutions $\Omega_c$ obtained with AlMg5 disk substrates.

The greater the number of the individual layers, the better the isotropy of the flexural modulus. Computations have shown that the flexural modulus has a remanent anisotropy of only 10%, if 48 lamellae are used. In the case of thinner lamelae, a greater number of lamellae can be arranged on top of each other at the same final strength of the substrate 1, thus improving the flexural modulus still further.

An essential modification in accordance with the invention provides for substrate 1 to be anisotropically structured, so that the shearing modulus and the flexural modulus can be influenced independently of each other in such a manner that the critical number of revolutions $\Omega_c$ is increased further. If the substrates in the lamellae close to the surface are reinforced, for example, by increasing the tensile/compression modulus, the flexural modulus and the shearing modulus in the disk plane x-z are influenced to different degrees. The shearing modulus increases only proportional to the percentage by volume of the reinforced areas, whereas the flexural modulus increases more than proportional as it is determined almost exclusively by the characteristics of the layers close to the surface. The magnitude of this non-linearity equals the second power of the distance from the neutral center plane M.

The increase in the critical number of revolutions $\Omega_c$ as a result of the anisotropic structure of the substrate 1 or the reinforcement of the lamellae close to the surface can be realized in different ways. One way consists in the Young's modulus and/or the Poisson's ratio of the outer lamellae being chosen higher than that or those of the inner lamellae. Another way is that proceeding from the same material, the density of the outer lamellae is chosen lower than that of the inner lamellae, which can be accomplished, for example, by means of a suitable other resin. Furthermore, proceeding from the same basic type of material, for example, carbon fiber reinforced prepregs, reinforcement may be effected in such a manner that the outer lamellae consists of carbon fibers with a higher Young's modulus.

Another approach for rendering the substrate 1 anisotropic, which is particularly attractive from the cost point of view, consists in the inner layers being made up of the less expensive glass fiber reinforced lamellae and the outer layers being made up of the more expensive carbon fiber reinforced lamellae.

We claim:

1. A magnetic disk substrate of plastic containing fibers, characterized in that said substrate is pressed in the form of a laminate from a plurality of thin lamellae of fiber-reinforced plastic, said lamellae being arranged on top of each other at equal angular spacings, $\theta = \pi/n$, n, an integer, $\geq 3$.

2. A magnetic disk substrate in accordance with claim 1, characterized in that said fibers in the individual lamellae in one direction are aligned to each other essentially in parallel so that said lamellae are anisotropic.

3. A magnetic disk substrate in accordance with claim 1, characterized in that the individual lamellae are arranged on top of each other at an angle of 0° and ±60°.

4. A magnetic disk substrate in accordance with claim 1, characterized in that the laminate structure extends respectively symmetrically to the center plane of said substrate and comprises an identical number of lamellae above and below said center plane.

5. A magnetic disk substrate in accordance with claim 4, characterized in that with each lamella arranged at a particular angle of arrangement on one side of said center plane of said substrate, there is associated one lamella with the same angle of arrangement on the other side of said center plane of said substrate, and all angular directions are provided equally frequently.

6. A magnetic disk substrate in accordance with claim 5, characterized in that said substrate is made up of up to 72 lamellae.

7. A magnetic disk substrate in accordance with claim 1, characterized in that the density of the outer lamellae is lower than that of the inner lamellae.

8. A magnetic disk substrate in accordance with claim 1, characterized in that the Young's modulus and the Poisson's ratio of the outer lamellae are greater than or equal to those of the inner lamellae.

9. A magnetic disk substrate in accordance with claim 8, characterized in that the Young's modulus of the fibers in the outer lamellae is greater than that in the inner lamellae.

10. A magnetic disk substrate in accordance with claim 9, characterized in that the outer lamellae contain carbon fibers and the inner lamellae contain glass fibers.

* * * * *